United States Patent [19]

Mennuto

[11] E Re. 29,236

[45] Reissued May 31, 1977

[54] DOOR ASSEMBLY INCLUDING INSERT STORING MEANS

[76] Inventor: Anthony R. Mennuto, 769 Pascack Road, Paramus, N.J. 07652

[22] Filed: Dec. 16, 1975

[21] Appl. No.: 641,339

Related U.S. Patent Documents

Reissue of:

[64] Patent No.: 3,891,020
Issued: June 24, 1975
Appl. No.: 430,727
Filed: Jan. 4, 1974

[52] U.S. Cl. ..... 160/37; 160/90

[51] Int. Cl.[2] ..... E06B 1/00; E06B 5/00; E06B 9/00

[58] Field of Search ..... 160/37, 89–92, 160/33; 49/372–375, 62

[56] References Cited

UNITED STATES PATENTS

| | | | |
|---|---|---|---|
| 1,507,158 | 9/1924 | Casey | 160/37 |
| 2,511,108 | 6/1950 | Hansen | 160/37 X |
| 2,559,005 | 7/1951 | Brown et al. | 160/33 |
| 2,702,595 | 2/1955 | Rumbaugh et al. | 160/90 |
| 3,599,703 | 8/1971 | Mennuto et al. | 160/90 |

*Primary Examiner*—Philip C. Kannan
*Attorney, Agent, or Firm*—Anthony F. Cuoco

[57] ABSTRACT

In a door assembly of the type including a core sandwiched between a pair of one piece panels and an opening in the upper part of the door for accepting a frame which receives removable screen and glass inserts, the core and frame are arranged so that the inserts may be stored in the bottom part of the door. The inserts and frame cooperate to retain decorative panels and/or edgings and the like.

9 Claims, 5 Drawing Figures

DOOR ASSEMBLY INCLUDING INSERT STORING MEANS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to doors and particularly to doors having removable screen and glass inserts. More particularly, this invention relates to an arrangement wherein the inserts are stored in the door when not in use.

2. Description of the Prior Art

Doors of the type including a pair of panels separated by a core and having removable screen and glass inserts, are described in U.S. Pat. No. 3,599,703 issued on Aug. 17, 1971 to A. Mennuto and N. Popovich and an improvement thereon described in U.S. Pat. No. 3,727,664 issued on Apr. 17, 1973 to A. Mennuto. A desirable feature in these doors is to provide means for storing the inserts i.e., storing the glass insert during the summer and the screen insert during the winter to prevent damage and/or breakage. Prior storage arrangements for doors having such inserts have included sliding arrangements such as described in U.S. Pat. No. 2,702,595 issued to Rumbaugh, et al. on Feb. 22, 1955 and roll-up arrangements such as described in U.S. Pat. No. 2,511,108 issued to Hansen on June 13, 1950. The obvious disadvantages of these arrangements include the addition of the required mechanism and the resulting increased cost of the door. Additionally, the prior art doors do not have the interchangeability and appearance features of the present invention.

SUMMARY OF THE INVENTION

This invention contemplates a door assembly including a core sandwiched between a pair of one piece panels. The upper portion of the panel and core sandwich has an opening which accepts a frame, and which frame has top, bottom and side members for retaining screen and glass inserts in the opening defined thereby. The top and side members of the frame are stationary and the bottom member is removable for exposing a channel formed by the core in the bottom portion of the door and which channel receives the inserts in self-storing fashion. The frame and the inserts cooperate to support decorative panels, grills, edgings or the like as may be desired.

One object of this invention is to provide a door of the type including a core sandwiched between a pair of one piece panels and a frame for retaining portions of the panels to define an opening in the door which accepts screen and glass inserts, and wherein the frame is adapted for exposing a channel formed by the core for storing the inserts.

Another object of this invention is to arrange the frame so that top and side members are stationary and the bottom member is removable for exposing the insert storing channel formed by the core.

Another object of this invention is to arrange the frame and inserts for cooperatively supporting decorative members and the like in the opening.

These and other objects and features of the invention are pointed out in the following description in terms of the embodiments thereof shown in the accompanying drawings. It is to be understood, however, that the drawings are not a definition of the limits of the invention, reference being had to the appended claims for this purpose.

DESCRIPTION OF THE INVENTION

Figure 1:
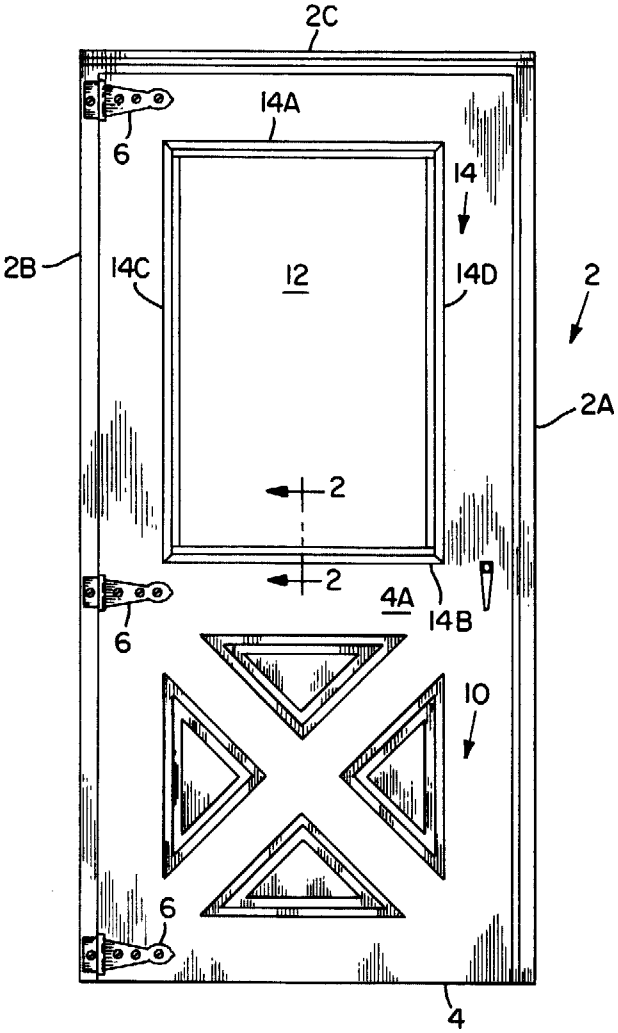
FIG. 1 is a pictorial representation of a door of the type embodying the features of the invention.

FIG. 1 shows an installation structure 2 having a pair of side members 2A and 2B commonly known in the art and hereinafter referred to as Z-bars. Structure 2 has an upper member or raincap 2C extending across the top and suitably secured to Z-bars 2A and 2B.

Figure 2A:
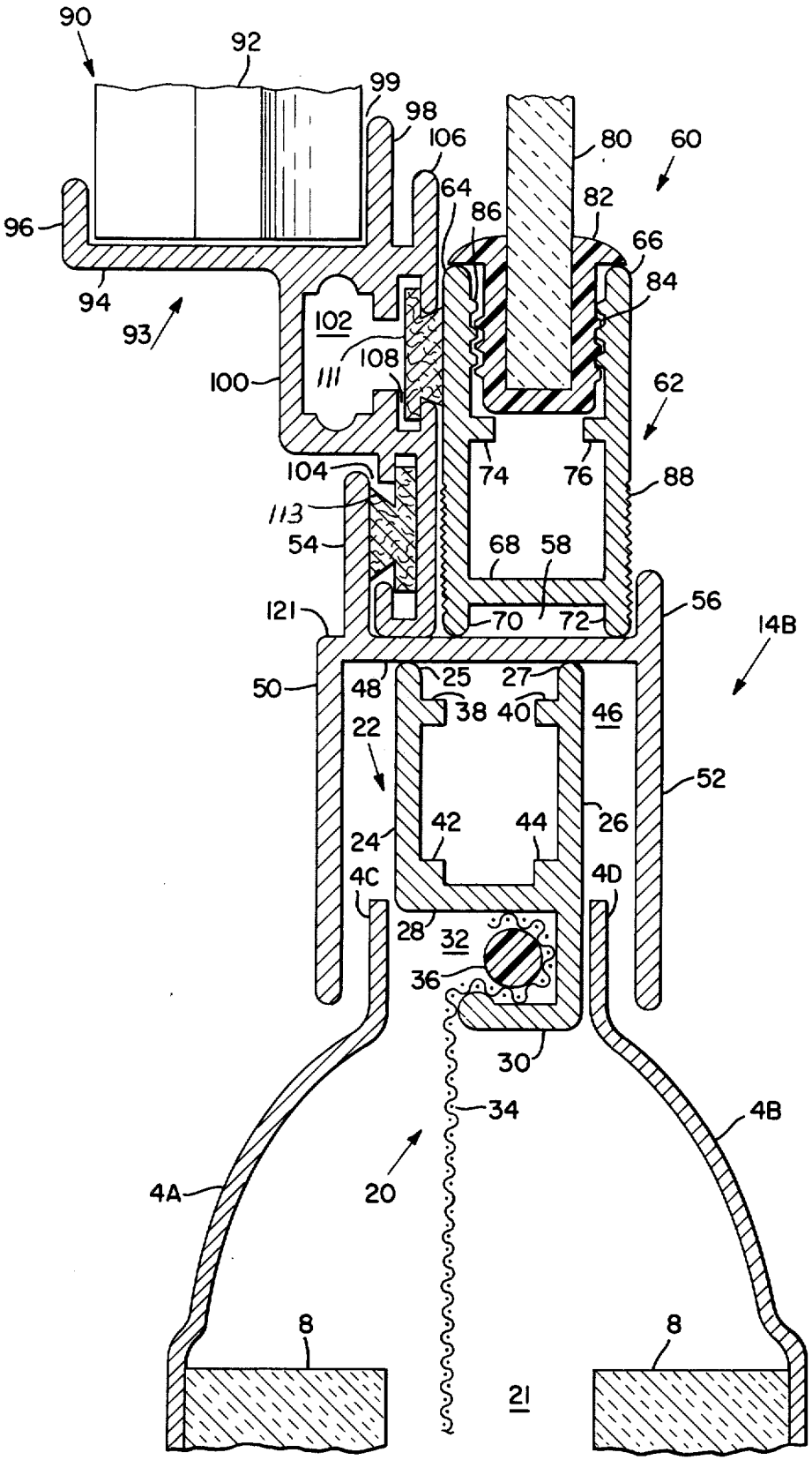
FIG. 2A is a sectional view taken along the line 2—2 in FIG. 1 and showing the bottom member of the frame retaining a glass insert, with said frame and insert cooperating to support a decorative edging, and a screen insert stored according to the invention.
Figure 2B:
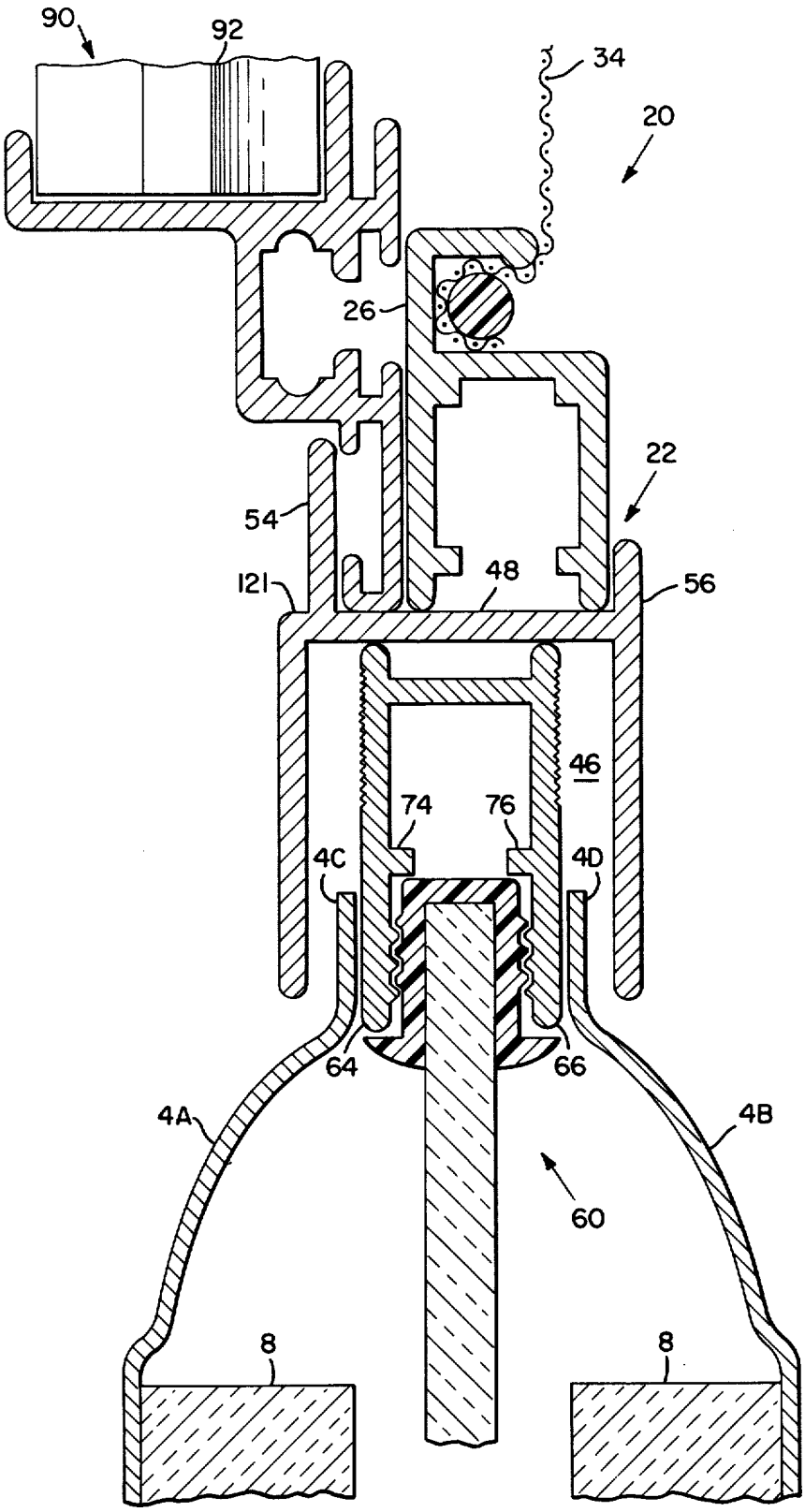
FIG. 2B is a sectional view taken along the line 2—2 in FIG. 1 and showing the bottom member of the frame retaining the screen insert, with said frame and insert cooperating to support a decorative edging, and the glass insert stored according to the invention.
Figure 3:
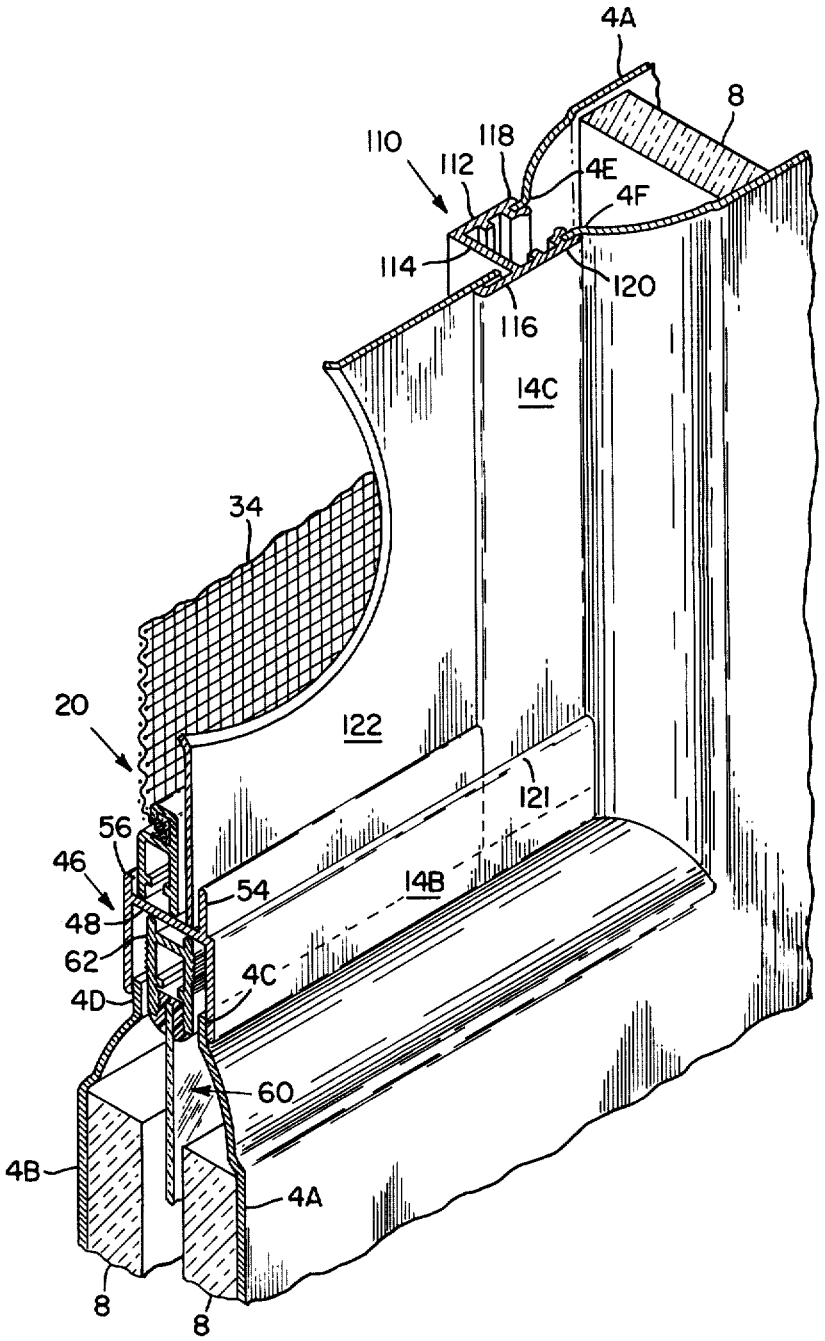
FIG. 3 is an isometric end sectional view showing the bottom frame member and a side frame member arranged for supporting the screen insert, with said frame and insert cooperating to support a decorative edging, and the glass insert stored according to the invention.

A door assembly 4 is hinged by hinges 6 to one of the Z-bars such as the Z-bar 2B. Door assembly 4 includes a one piece panel 4A shown in FIG. 1, a one piece panel 4B shown in FIGS. 2A, 2B and 3 and a core 8 sandwiched between said panels 4A and 4B as shown in FIGS. 2A, 2B and 3. The lower portions of panels 4A and 4B include embossed designs such as the crossbucks 10, and which lower portions otherwise serve as kickplates. Alternately, the bottom portions of the panels may be flat and suitable designs may be fastened thereto. The upper portions of the panels include rectangular openings which cooperate upon assembly to form opening 12 shown in FIG. 1. Opening 12 receives a rectangular frame 14 having top and bottom members 14A and 14B, respectively, and side members 14C and 14D. Top member 14A and side members 14C and 14D may be suitably keyed or otherwise fastened together so as to be stationary. Bottom member 14B is removably arranged therewith for purposes to be hereinafter described. The frame members may be of rigid vinyl or of a metal such as aluminum. Members 14A, 14C and 14D may each have like sections as illustrated in FIG. 3 and member 14B has a section as shown in FIGS. 2A, 2B and 3.

Core 8 may include suitable separators, structural members and insulating members, and may further include a top cap, bottom cap and side caps for supporting panels 4A and 4B. All of the aforenoted members and caps may be of suitable materials commensurate with design and cost features, and may be nonmetallic when thermal properties are desired or metallic when structural considerations are of prime importance. A core of this type is described in the aforenoted U.S. Pat. No. 3,599,703.

With reference now to FIG. 2A, a screen insert is designated by the numeral 20 and may be of a material similar to that of frame 14. Insert 20 is a rigid rectangular element having top, bottom and a pair of side members. Each of the members has a section such as that designated as 22 in the figure.

Section 22 is generally U-shaped having a pair of parallel legs 24 and 26 and a base 28. Leg 26 extends longitudinally beyond base 28 and terminates in an inwardly extending arm 30. Arm 30 cooperates with base 28 to form a channel shaped section 32 which retains a screen 34 through a rod shaped spine 36 of vinyl or such other suitable material as described in the aforenoted U.S. Pat. Nos. 3,599,703 and 3,726,664.

Screen insert 20 is shown in FIG. 2A as stored according to the invention. To this end core 8 is arranged to provide a channel 21 for receiving the insert with sufficient clearance. Core 8 may include a bottom member (not shown) for supporting screen insert 20, the same being understood in view of the core arrangement shown in the aforenoted U.S. Pat. No. 3,599,703.

With screen insert 20 so stored, U-shaped section 22 extends above panels 4A and 4B, while C-shaped section 32 is between said panels. In this connection it is noted that the channel formed by legs 24 and 26 and base 28 of the U-shaped section may be shouldered at 38, 40, 42, 44 for retaining a key (not shown) whereby the insert members may be secured to each other to form a rigid insert as is well known in the art.

Frame member 14B is shown as having an inverted U-shaped section 46 which includes a base 48 and a pair of parallel legs 50 and 52 of equal length. A shorter leg 54 extends beyond base 48 in a direction opposite and substantially parallel to leg 50 and a still shorter leg 56 extends beyond the base in the direction of leg 54. Leg 56 is actually an extension of leg 52. Legs 54 and 56 together with base 48 form a channel 58. Leg 56 is shorter than leg 54 to facilitate insert installation as will become evident.

With screen insert 20 stored as shown in FIG. 2A and frame members 14A, 14C and 14D arranged in opening 12 in door 4 (FIG. 1), channel 46 of bottom frame member 14B is disposed over section 22 of screen insert 20, with frame member 48 being thereupon adjacent nodes 25 and 27 of legs 24 and 26 of insert member 22. It will be understood that the dimensions of the door are such that when section 22 is so positioned ends 4C and 4D of panels 4A and 4B, respectively, are near the inner surface of legs 50 and 52 as shown in the figure.

With further reference to FIG. 2A, a glass insert 60 is rectangular in shape and includes top, bottom and a pair of side members. Each member has a section such as that designated as 62 in the figure. Insert 60 may be of the same material as frame 14 and insert 20.

Section 62 is substantially U-shaped with a pair of parallel legs 64 and 66 and a base 68. Legs 64 and 66 terminate in nodes 70 and 72, respectively, and which nodes extend beyond base 68. The nodes are adjacent the upper surface of base 48 of frame member section 46 between legs 54 and 56 and, in the preferred embodiment of the invention, are disposed toward leg 56 of frame member section 46.

Legs 64 and 66 are divided by ledges 74 and 76, respectively, and which ledges support a glass pane 80. Glass pane 80 is carried in a U-shaped track or channel 82 which may be of vinyl or some other such suitable material, and includes outside serrations 84 or the like for engaging mating serrations 86 on the inside of legs 64 and 66 above ledges 74 and 76, whereby channel 82 is locked in position.

The glass insert members are suitably keyed through keys (not shown) carried in the channel defined by base 68 and legs 64 and 66 below ledges 74 and 76 to provide a rigid insert. The insert is held in position by a clamp (not shown) secured to frame 14 and insert 60 to facilitate assembly and disassembly as is known in the art. In consideration of the weight of insert 60, the lower portions of legs 64 and 66 carry external serrations or the like 88 to facilitate gripping the insert when removing the insert from storage as is more evident with reference to FIG. 2B.

A decorative insert 90 which may carry a grill or panel 92 is retained between leg 64 of glass insert section 62 and leg 54 of frame insert section 46 so as to be in front of the insert. Insert 90 is likewise a rectangular element which may be of the same material as frame 14 and inserts 20 and 60, and has top, bottom and a pair of side members each of which has a section 93 as shown in the figure.

Section 93 has a substantially T-shaped portion with a cross member 94 terminating in upwardly extending arms 96 and 98 which form a channel 99 for retaining panel 92. Base 100 of the T-shaped portion of section 93 terminates in an inwardly extending C-shaped portion 102 and the bottom of C-shaped portion 102 terminates in an outwardly extending C-shaped portion 104. C-shaped portion 104 is disposed between legs 54 of section 46 and 64 of section 62 and adjacent the upper surface of base 48, whereby insert 90 is retained in door opening 12 (FIG. 1).

Section 93 includes an arm 106 which extends parallel and in spaced relation to arm 98, and extends below cross-bar 94 for forming a channel 108 with C-shaped portion 102. Channel 108 and C-shaped portion 104 carry weather stripping elements 111 and 113, respectively, which may be of wool piling as shown or some other such suitable material. C-shaped portion 102 carries a suitable key or the like (not shown) whereby the members of insert 90 are secured each to the other to form a rigid insert.

With reference now to FIG. 2B wherein glass insert 60 is shown stored according to the invention, the portions of legs 64 and 66 of glass insert section 62 below ledges 74 and 76 are disposed between ends 4C and 4D of panels 4A and 4B, respectively. The portions of the legs above the ledges extend beyond the panel ends and are adjacent the lower surface of base 48.

Screen insert section 22 rests on cross bar 48 of frame member section 46 and near leg 56 thereof. Decorative insert 90, carrying member 92, is retained between leg 26 of screen insert section 22 and leg 54 of frame insert section 46 as heretofore described with reference to FIG. 2A.

With reference now to FIG. 3, glass insert 60 is shown stored according to the invention and as described in detail in FIG. 2B. Insert 46 of frame member 14B is disposed over section 62 of glass insert member 60. Screen insert member 20 is retained intermediate legs 54 and 56 of section 46, being disposed toward end 56.

FIG. 3 further shows a section of side frame member 14C, and which section may be similar to the sections of frame members 14A and 14D as heretofore noted.

The section includes an H-shaped portion 110 having a leg 112, a cross member 114 and a leg 116 extending parallel to leg 112 and beyond base member 114. Legs 112 and 116 have shoulders 118 and 120, respectively, at the bottoms thereof for retaining ends 4E and 4F of panels 4A and 4B, respectively, and in this respect the arrangement is similar to that described in the aforenoted U.S. Pat. No. 3,599,703. The sections of panels 4A and 4B beyond portion 110 are separated by core 8 as shown in the figure.

Frame members 14A, 14C and 14D are suitably keyed or otherwise affixed to each other and may be arranged in miter joint fashion as shown in FIG. 1 or in butt joint fashion as will be understood by those skilled in the art. Removable frame member 14B is arranged in butt joint fashion with the side frame members, and is shown so arranged with frame member 14C in FIG. 3. Thus, the bottom end of leg 116 of section 110 of frame member 14C rests atop end 4C of panel 4A. Leg 54 of the H-shaped section extends transversely and abutts the edge of leg 116. In this connection it will be understood that bottom frame member 14B when so positioned spreads side members 14C and 14D apart for supporting side members 14C and 14D in rigid fashion.

A scalloped edging or the like 122 is retained by frame 14 and insert 20 as shown in FIG. 3. Edging 122 is disposed in front of insert 20 intermediate the insert and leg 54 of frame member section 46 and leg 116 of frame member section 14C, with the edging being retained by corresponding elements of frame members 14A and 14D as will now be understood. When screen insert 20 is in storage and glass insert 60 is in use, edging 122 will be similarly retained by corresponding legs 116 of the top and side frame members, leg 54 of the bottom frame member and legs 64 or 66 of glass insert member 20, as the case may be.

Figure 4:
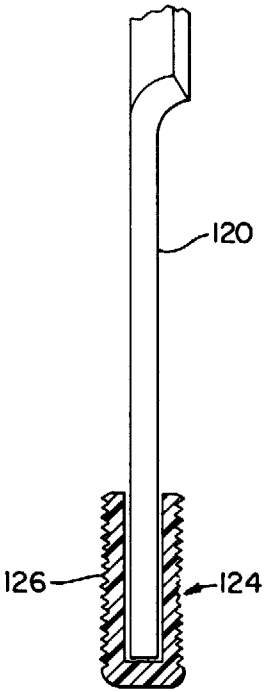
FIG. 4 is a partially sectioned view showing the decorative edging of FIGS. 2A, 2B and 3 arranged with a weather stripping channel as may be desired.

FIG. 4 shows edging 122 retained in a suitable weather stripping channel 124 which may be of vinyl or some other such suitable material. In this case, the vinyl channel is retained between the insert and frame member elements as aforenoted and carries deformable external serrations or the like 126 which aid in rendering the edging stationary as will now be understood.

As best shown in FIG. 3, edging 122 bevels toward screen 34 or glass 80 as the case may be, to give a pleasing appearance as is often desired.

It will now be seen that the aforenoted objects of the invention have been met. Frame 14 includes stationary top and side members and a removable bottom member for exposing the insert storing channel formed by core 8. The frame and inserts are arranged for cooperatively supporting decorative members and the like in door opening 12. The improved door herein disclosed satisfies a need wherein the removable screen and glass inserts are stored when one or the other is not in use. This is accomplished without the addition of costly hardware and satisfies a standing need in the art in a manner which does not detract from the appearance of the door.

Although several embodiments of the invention have been illustrated and described in detail, it is to be expressly understood that the invention is not limited thereto. Various changes may also be made in the design and arrangement of the parts without departing from the scope and spirit of the invention as the same will now be understood by those skilled in the art.

What is claimed is:

1. In a door assembly of the type including a pair of panels and a core sandwiched between the panels, the panels having portions which surround a substantially rectangular opening in the upper part of the door, and a frame adjacent the panel portions for defining the opening and for supporting a removable insert therein, the improvement comprising:

the frame including top, bottom and a pair of side members adjacent corresponding panel portions for defining the opening and for supporting the removable insert therein, the top and side members are stationary in the opening and the bottom frame member is removable for exposing a portion of the core in the lower part of the door and which removable frame member separates the upper and lower parts of the door;

the exposed core portion arranged for providing a channel which receives the insert for storage when the insert is removed from the frame;

the stored insert is disposed between the panel portions adjacent the bottom frame member and includes a portion which extends beyond the panel portions;

the bottom frame member includes a downwardly extending first channel portion and an upwardly extending second channel portion;

the first channel portion receives the portion of the stored insert which extends beyond said panel portions adjacent the bottom frame member, and is adjacent said insert and panel portions;

the second channel portion cooperates with the top and side frame members for retaining an interchangeable second insert in the opening when the first mentioned insert is in storage; and the second channel portion, top and side frame members and second insert cooperate to retain a decorative member in front of said insert when the insert is retained in the opening.

2. A door assembly as described by claim 1, wherein:

the first channel portion includes a top member and a pair of downwardly extending spaced side members;

the top member is adjacent said insert; and the side members are adjacent said panel portions.

3. A door assembly as described by claim 1, wherein:

the second channel portion includes a bottom member and a pair of upwardly extending spaced side members;

the second insert is adjacent the bottom member and near one of the side members; and the decorative member is disposed adjacent the bottom member and between the second insert and the other side member.

4. A door assembly as described by claim 3, wherein:

one of the pair of upwardly extending side members is shorter than the other; and the second insert is near the shorter side member.

5. A door as described by claim 1, wherein:

the bottom frame member spreads the side frame members apart for supporting said members.

*6. A door assembly as described by claim 1, wherein:*

*the panels having portions which surround a substantially rectangular opening in the upper part of the door are one piece panels; and*

*the lower portions of the one piece panels have areas which serve as kick plates.*

*7. A door assembly as described by claim 6, wherein:*

*the kick plate areas in the lower portions of the one piece panels carry designs.*

*8. A door assembly as described by claim 7, wherein:*

*the designs are embossed in the kick plate areas of the one piece panels.*

*9. A door assembly as described by claim 7, wherein:*

*the designs are secured to the kick plate areas of the one piece panels.*

* * * * *